(12) United States Patent
Cathey, Jr.

(10) Patent No.: US 6,642,504 B2
(45) Date of Patent: Nov. 4, 2003

(54) HIGH SPEED CONFOCAL MICROSCOPE

(75) Inventor: Wade Thomas Cathey, Jr., Boulder, CO (US)

(73) Assignee: The Regents of the University of Colorado, Boulder, CO (US)

( * ) Notice: Subject to any disclaimer, the term of this patent is extended or adjusted under 35 U.S.C. 154(b) by 0 days.

(21) Appl. No.: 09/814,197

(22) Filed: Mar. 21, 2001

(65) Prior Publication Data

US 2002/0134921 A1 Sep. 26, 2002

(51) Int. Cl.⁷ .................................................. H01J 3/14
(52) U.S. Cl. ..................... 250/216; 250/201.3; 359/385; 356/5.15
(58) Field of Search .............................. 250/216, 201.3, 250/208.1, 578.1, 201.2; 362/321, 348; 359/368, 385–389; 348/161; 356/5.06, 5.15

(56) References Cited

U.S. PATENT DOCUMENTS

| | | | |
|---|---|---|---|
| 3,665,097 A | * | 5/1972 | Macovski ................... 348/161 |
| 4,818,100 A | * | 4/1989 | Breen ......................... 356/5.06 |
| 5,082,364 A | * | 1/1992 | Russell ....................... 356/5.15 |
| 6,037,579 A | * | 3/2000 | Chan et al. .................. 250/216 |
| 6,121,603 A | * | 9/2000 | Hang et al. .................. 250/216 |
| 6,248,988 B1 | * | 6/2001 | Krantz ...................... 250/201.3 |
| 6,288,382 B1 | * | 9/2001 | Ishihara .................... 250/201.3 |
| 6,337,472 B1 | * | 1/2002 | Garner et al. ............ 250/201.3 |

* cited by examiner

*Primary Examiner*—Kevin Pyo
*Assistant Examiner*—Seung C. Sohn
(74) *Attorney, Agent, or Firm*—Curis A. Vock; Lathrop & Gage L.C.

(57) ABSTRACT

An improved confocal microscope utilizes an array of light sources imaged onto an object, and an array of small detectors to detect the light from each source. Cross talk between the beams of light is prevented by temporally modulating the sources at different frequencies. Light from one source is temporally modulated at a first frequency, for example in the megahertz region. A reference signal at the same frequency plus an offset frequency is also sent to the detector assigned to that source. The detected signal and the reference signal are then beat together, and heterodyne detection is used to detect only the light from the assigned source, which will beat with the reference signal and produce a signal at the offset frequency. Light from other sources beat with the reference signal to produce different frequency beat signals, which are filtered out using bandpass filters.

16 Claims, 4 Drawing Sheets

HIGH SPEED CONFOCAL MICROSCOPE

BACKGROUND OF THE INVENTION

1. Field of the Invention

The present invention relates to confocal microscopes.

2. Description of the Prior Art

Conventional confocal microscopes use a point source that is imaged onto the object that is to be imaged. Then, another imaging system images that part of the object through a pinhole onto a detector. By doing this, the resolution of the final image is increased because the impulse responses (or point spread functions) of each part of the system (the first imaging subsystem that images the source onto the object and the second imaging subsystem that images the object region onto the detector) are multiplied. This gives a narrower overall point spread response, and hence, better resolution.

The primary use of a confocal microscope, however, is to provide an image of a plane of the object without interference from other planes. That is, the confocal microscope provides an image of a slice of the object. This is accomplished because when the image of the point source is re-imaged by the second imaging subsystem onto the pinhole in front of the detector, only the light that comes from the plane being examined is focused through the pinhole. Any light from other planes spreads out rapidly and a negligible portion gets through the pinhole.

In order to image the whole plane being examined, both the point source and the pinhole in front of the detector must be scanned over a two dimensional array of positions corresponding to the slice. Alternatively, the object may be moved in two dimensions transverse to the optical axis.

Then, to examine another slice of the object, the point source is focused onto the new slice, and the scanning process is repeated. Repeating this process gives images of several slices in a volume. Alternately, the object can be moved along the optical axis.

The process of examining even a single slice of the object is very time consuming (much less many slices). Of course it works poorly with live, moving objects, because they move during the scanning time and distort the image.

Other confocal microscopes have speeded up the scanning process to some extent by using an array of micro mirrors to illuminate isolated points or by using spinning wheels with several holes in them, so that several point images can be detected at once. These point images must be far apart so that light directed at one detector pinhole does not go through a different detector pinhole when light from other planes is considered. This causes cross talk. A similar approach uses lenslett arrays to provide multiple point images. Again, the point images must be far apart. Thus, the scanning process is still very slow.

A third approach is to use structured illumination with fine detail that blurs quickly with misfocus. This approach requires multiple exposures to remove the structured illumination from the images.

A need remains in the art for faster confocal microscopes.

SUMMARY

An object of the present invention is to provide an improved, faster, confocal microscope. The present invention accomplishes this goal by utilizing an array of light sources imaged onto the object, and an array of small detectors to detect the light from each source. The light could be visible, infrared, or ultraviolet. Cross talk between the beams of light is prevented by temporally modulating the sources at different frequencies.

Light from one source is thus temporally modulated at a first frequency, for example in the megahertz region. A reference signal at the same frequency plus a frequency offset is also sent to the detector assigned to that source. The detected signal and the reference signal are then beat together, and heterodyne detection and a band pass filter are used to detect only the light from the assigned source. The light from the source will beat with the reference signal and produce a signal at the offset frequency. This signal is passed by the bandpass filter. Light from other sources, which is modulated at still different frequencies, will beat with the reference signal to produce different beat signals, which can be filtered out using the band pass filter.

The detector array must be a type that can provide heterodyning, such as photodiode arrays, photo multipliers with arrays of sensor areas, and CMOS detector arrays. The array of sources must comprise near point sources, for example an array of surface emitting lasers. As an alternative, the source array may comprise liquid crystal modulators illuminated with the desired illumination wavelength. The image of the source array that appears on the object can be demagnified to provide the desired resolution.

To image a different plane of the object, either the object is moved (with respect to the source array), or the lenses refocused, as in a conventional confocal microscope.

The number of distinct temporal modulation frequencies that are required is determined by the region of the detector array over which light from one source overlaps onto detectors other than the one intended for that source. This is, in turn, determined by the thickness of the object being imaged. Sources may be modulated with the same frequency, so long as they are far enough apart to not overlap on the detector array.

BRIEF DESCRIPTION OF THE DRAWINGS

In FIG. 1a, a point on the object is imaged through a pinhole onto the detector.

In FIG. 1B, a point at a different depth on the object is not imaged through the pinhole, because of misfocus.

DETAILED DESCRIPTION OF THE PREFERRED EMBODIMENT

Figure 1A:
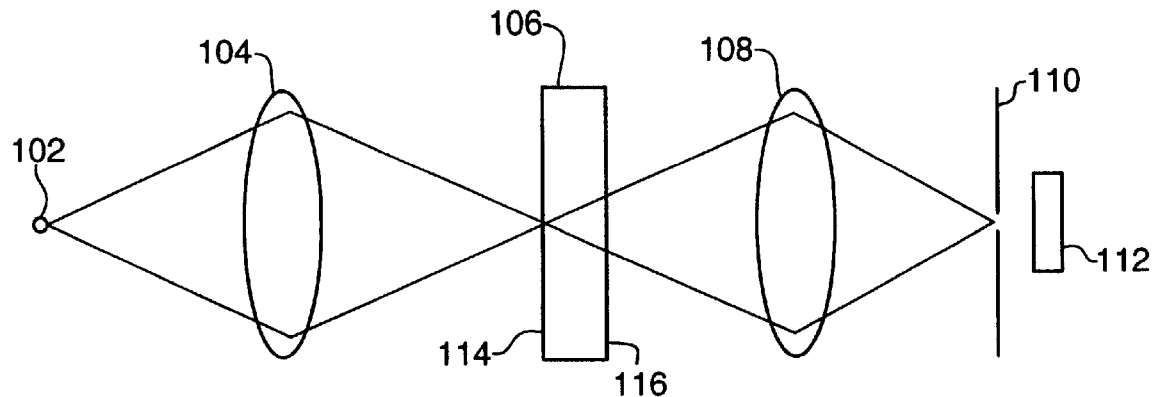
FIGS. 1a and 1b are side views illustrating confocal microscope imaging.
Figure 1B:
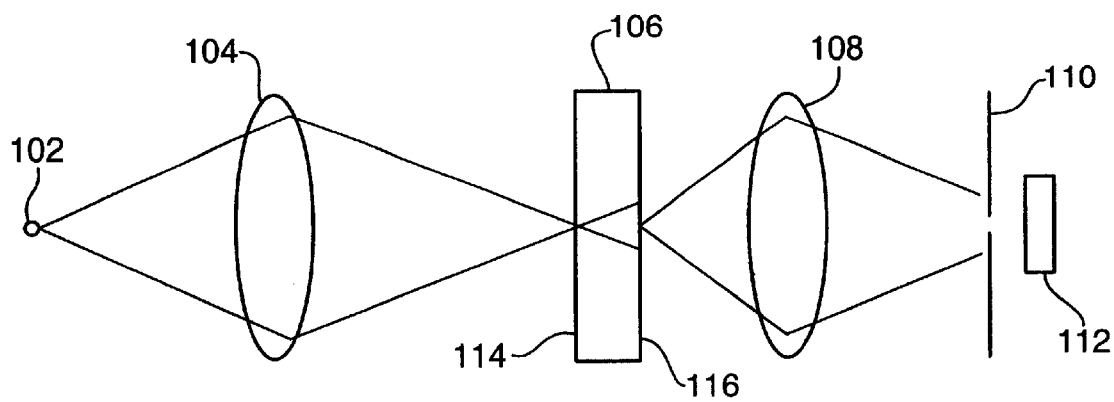

FIGS. 1a and 1b are side views illustrating confocal microscope imaging. In FIG. 1a, a point on the object is imaged through a pinhole onto the detector (pinholes are not required if the detectors are very small. The size of the pinhole, if used, determines the lateral resolution). In FIG. 1b, a point at a different depth on the object is not imaged through the pinhole, because of misfocus. Confocal microscopes use a point source 102 that is imaged by imaging system 104 onto the object 106 that is to be imaged. Then, another imaging system 108 images the illuminated part of the object through pinhole 110 onto detector 112. In FIG. 1*a*, surface 114 of object 106 is being imaged. Thus, light focused onto the object point on surface 114 is imaged as a point onto pinhole 110, and most of the light impinges on detector 112.

In FIG. 1*b*, surface 114 is still being imaged, so light from surface 116 does not focus to a point at pinhole 110. Consequently, only a small amount of the light from surface 116 gets through the pinhole to detector 112.

Figure 2A:
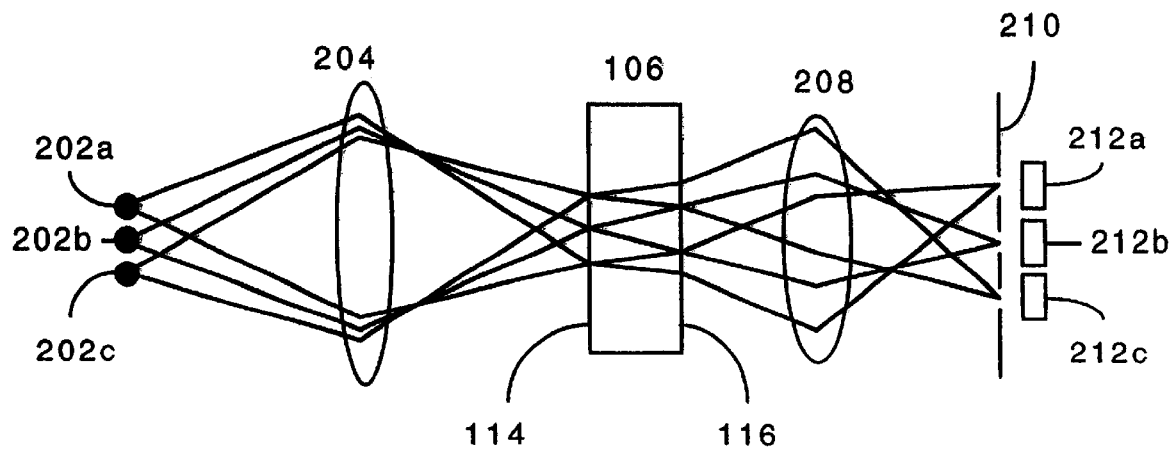
FIGS. 2a and 2b are side views illustrating a confocal microscope according to the present invention.
Figure 2B:
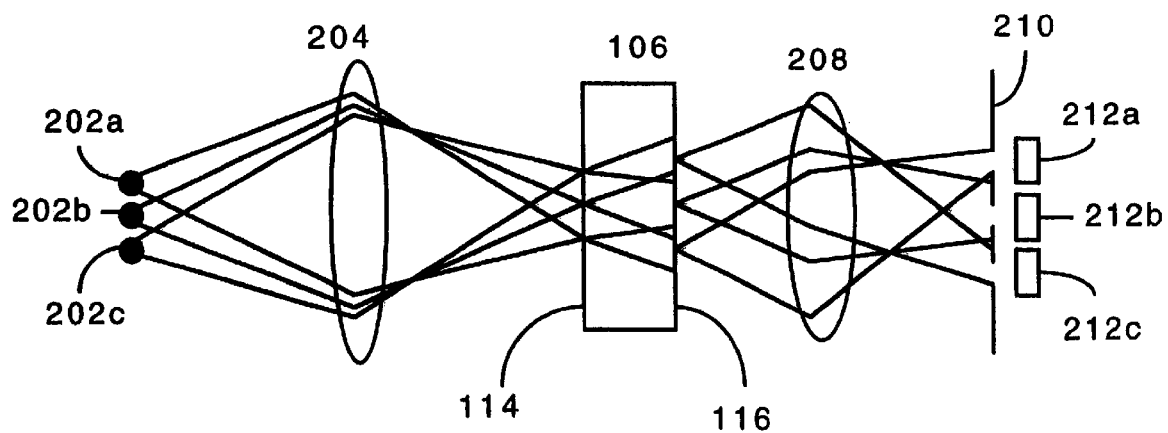

FIGS. 2*a* and 2*b* are side views illustrating a confocal microscope 200 according to the present invention. An array of light sources 202 are imaged via lens 204 onto surface 114 of object 106, and an array of small detectors 212 behind an array of pinholes 210 detect the light from each source.

Figure 3:
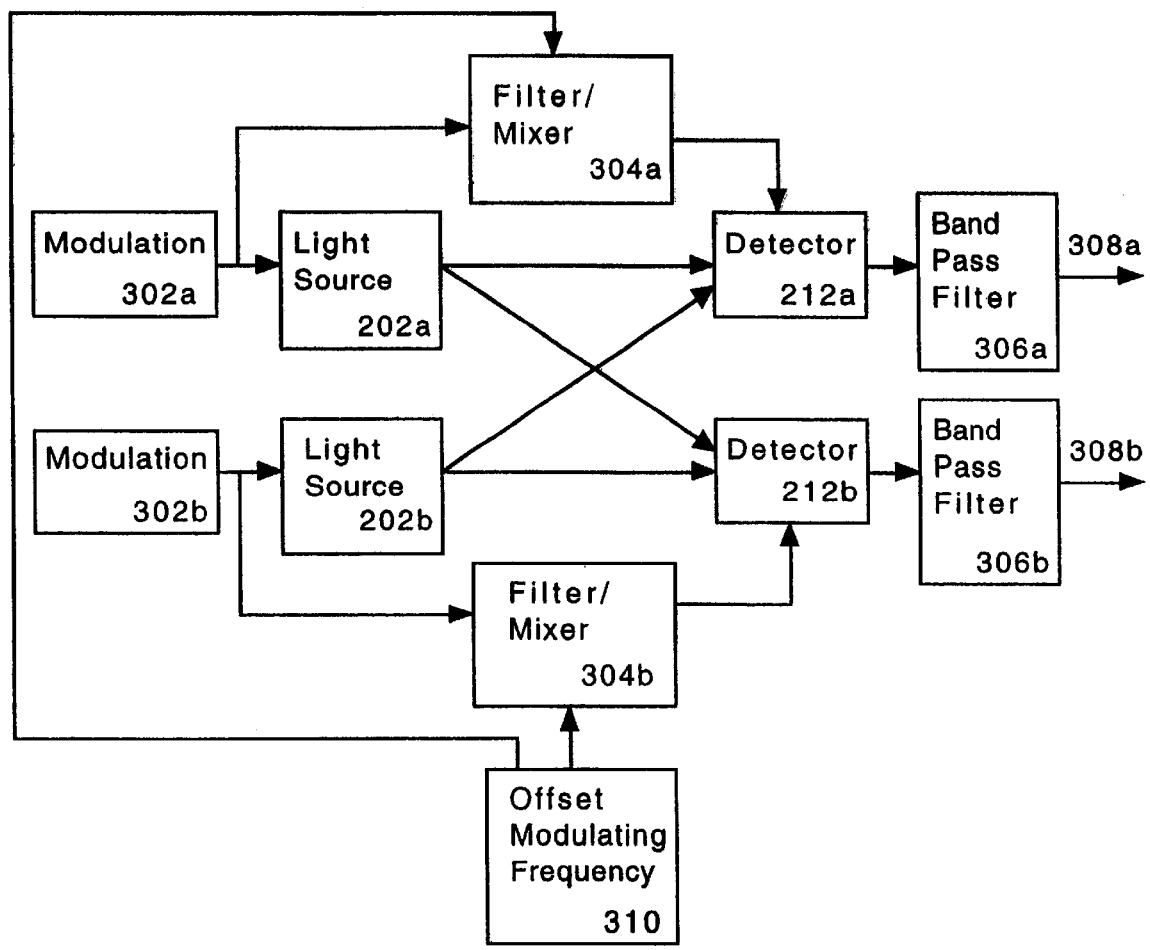
FIG. 3 is a block diagram illustrating the operation of the confocal microscope of FIGS. 2a and 2b.

Cross talk between light from different sources is prevented by temporally modulating the sources at different frequencies. FIG. 3 illustrates how this is accomplished.

FIG. 2*b* illustrates what happens to light scattered from out-of-focus surface 116. This light overlaps onto a number of pinholes 212. Thus, the temporal modulation is required to permit light from the wrong source to be ignored.

FIG. 3 is a block diagram illustrating the operation of the confocal microscope of FIGS. 2*a* and 2*b*. For simplicity, operation with two sources is shown. In practice, many more sources would be used. Light from first source 202*a* is temporally modulated at a first frequency, for example 5 megahertz, by modulation block 302*a*. A reference signal at the same frequency (5 MHz) is also sent to mixer and bandpass filter 304*a*, where it is mixed with a different offset modulating frequency 310, in this case 1 MHz. The output of mixer/filter 304*a* (at 4 MHz) is provided to detector 212*a*.

Similarly, light from second source 202*b* is temporally modulated at a second frequency, for example 10 megahertz, by modulation block 302*b*. A reference signal at the same frequency is also sent to mixer and band pass filter 304*b*, where it is mixed with a modulating signal that is offset by 1 MHz (for example), resulting in a reference signal of 9 MHz. The output of mixer 304*b* (at 9 MHz) is provided to detector 212*b*.

Signals to be mixed in a detector can be introduced to the detector either electrically or optically. When light that is modulated at one frequency f1 falls on a detector that also has an electrical input at a second frequency f2, the output of the detector has two frequency components; f1+f2 and f1−f2.

FIG. 2*b* shows that some light can spread and be detected by detectors other than the ones intended. For example, because of scattering from surface 116, light from source 202*b* can pass through the pinhole in front of detect or 212*a*. Even though this light is reduced in intensity because less light comes through the pinhole in front of the detector, it and light from other sources contaminates the signal at detector 212*a*, and reduces the quality of the image. This problem is solved by modulating the light from the sources 202*a* and 202*b* at different frequencies.

The output of mixer 304*a* is the sum and difference of the 5 MHz modulation frequency and the 1 MHz offset modulating frequency. A filter passes only the 4 MHz frequency, for example, and blocks the 6 MHz frequency. The 4 MHz frequency signal is introduced to the detector, and it mixes both with the direct light modulated at 5 MHz from source 202*a*, and the undesired light that comes from source 202*b* via surface 116, which is modulated at 10 MHz.

The result is an electrical output of the detector that has sum and frequency components at 1 MHz, 5 MHz, 6 MHz, 9 MHz, 14 MHz, and 15 MHz. The bandpass filter 306*a* passes to output 308*a* only the 1 MHz component which comes from interference between the desired 5 MHz signal due to the modulated light from source 202*a* and the reference frequency from filter/mixer 304*a*.

Among the frequencies that are blocked are those that arise from interference between the reference frequency and the undesired 10 MHz signal from light that is from the modulated source 202*b*. In a similar manner, only the signal from 202*b* is passed to output 308*b*, and all of the others are removed.

Those skilled in the art will appreciate that this scheme can be extended to more than two sources, so long as the frequencies are carefully chosen. If there is sufficient distance between two sources, they can have the same modulation frequency without reducing the quality of the image. For example, for the thickness of the object 106 as shown, the light from sources 202*a* and 202*c* do not overlap, even for the extreme value of misfocus of light coming from surface 116. Hence sources 202*a* and 202*c* could have the same modulation frequency. Thus, the same modulation frequency might be used in a pattern, e.g. every third or fourth source.

The light from object 106 need not be the same wavelength as the illumination light. For example, in fluorescence microscopy, the illuminating light excites fluorophores in the object. These then fluoresce at a wavelength that is different from the illumination. This technique is used to image specific regions of a biological image, for example, that have the fluorophores attached to them. The light from the fluorophores is modulated at the same frequency as the modulation of the illumination light. Hence, the technique described above is valid for confocal fluorescence microscopes as well.

Figure 4:
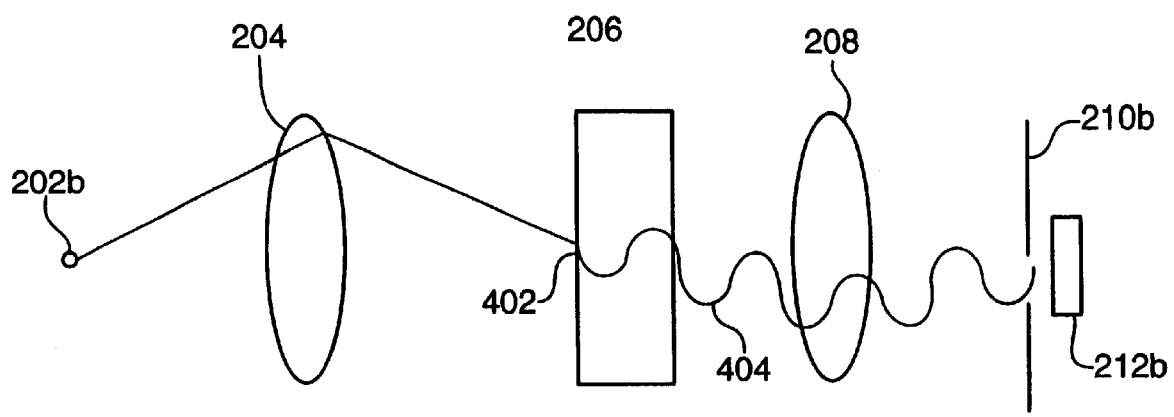
FIG. 4 is a side view of a fluorescing confocal microscope according to the present invention.

FIG. 4 is a side view of a fluorescing confocal microscope according to the present invention. When light from source 202*b* (for ample) hits object 206, light 404 at the fluorescing wavelength is emitted. Optics 208 focus this light through pinhole 210*b* onto detector 212*b*. Because the fluorescence is caused by a modulated excitation source, the fluorescent light is also modulated at the same frequency. Hence, by using several sources that are modulated at different frequencies, the fluorescing light from different object points also has different modulating frequencies, and can be separated as shown in FIG. 3.

Detector array 212*b* must be the type that can provide heterodyning, such as photodiode arrays, photo multipliers with arrays of sensor areas, or CMOS detector arrays. CCD arrays, which ignore temporal modulation, cannot be used.

Source array 202 must comprise approximately point sources, for example an array of surface emitting lasers. As an alternative, the source array may comprise liquid crystal modulators illuminated with the desired illumination wavelength. The light can be infrared, visible, or ultraviolet. Ultraviolet light is often used for high resolution, and also for fluorescence microscopy.

The image of the source array that a pears on object 206 can be demagnified to provide the desired resolution. To image a different plane of object 206, either object 206 is moved with respect to source array 202, or image g system 204 is refocused.

The spacing for the pinholes for the detector array and the spacing of the detectors need not be the same. An imaging system between the two can be used to image the light that passes through the array of pinholes that are in front of the detectors onto the array of detectors.

Figure 5:
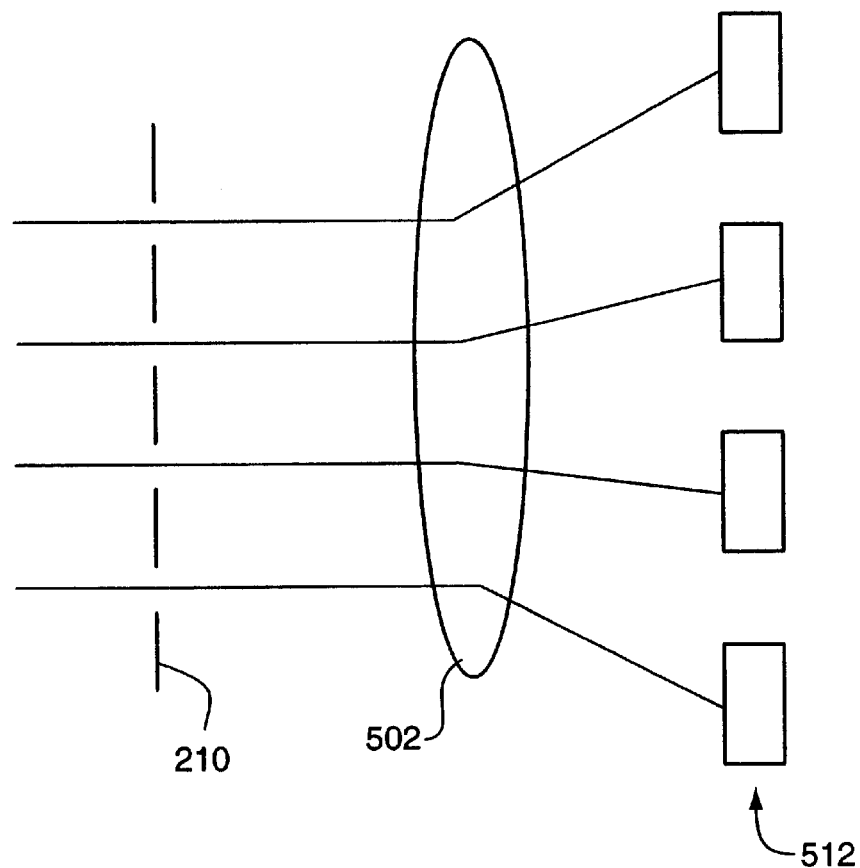
FIG. 5 is a side view illustrating a variation on the microscope of FIGS. 2a and 2b.

FIG. 5 is a side view illustrating a variation on the microscope of FIGS. 2a and 2b. Additional optics 502 are placed between pinhole array 210 and detector array 512, in order to redirect the light from the pinholes onto the desired detectors. This is useful if the detector array must have a wider spacing than the array of sources.

What is claimed is:

1. A confocal microscope comprising:

an array of light sources;

means for imaging the array of light sources onto a plane of an object;

an array of detectors, each detector corresponding to a source;

means for imaging light from the object onto the array of detectors; and means for removing cross talk between light from sources including, for each source, means for modulating light from the source at a specified frequency, means associated with the corresponding detector for beating the signal detected by the detector with a signal at the modulating frequency plus a different offset frequency, and a band pass filter for filtering out out-of-band frequencies from the offset frequency.

2. The confocal microscope of claim 1, wherein the light sources emit visible light.

3. The confocal microscope of claim 1, wherein the light sources emit infrared light.

4. The confocal microscope of claim 1, wherein the light sources emit ultraviolet light.

5. The confocal microscope of claim 1, wherein the beating means operates on optical signals.

6. The confocal microscope of claim 1, wherein the beating means operates on electrical signals.

7. The confocal microscope of claim 1, wherein the object includes fluorophores, and wherein the fluorophores fluoresce at a fluorescing frequency when impinged upon by a light source, and wherein the detectors detect light at the fluorescing frequency.

8. The confocal microscope of claim 1, further including an array of pinholes, corresponding to the array of detectors and located between the object and the array of detectors adjacent, for enhancing lateral resolution.

9. A confocal microscope comprising:

an array of light sources;

means for imaging the array flight sources onto a plane of an object;

an array of detectors, each detector corresponding to a source;

an array of pinholes corresponding to the array of detectors and located between the object and the array of detectors;

means for imaging light from the object onto the array of pinholes;

optics between the pinhole array and the detector array for focusing light from the pinhole array onto the detector array; and means for removing cross talk between light from sources including, for each source, means for modulating light from the source at a specified frequency, means associated with the corresponding detector for beating the signal detected by the detector with a signal at the modulating frequency plus a different offset frequency, and a band pass filter for filtering out out-of-band frequencies from the offset frequency.

10. The confocal microscope of claim 9, wherein the light sources emit visible light.

11. The confocal microscope of claim 9, wherein the light sources emit infrared light.

12. The confocal microscope of claim 9, wherein the light sources emit ultraviolet light.

13. The confocal microscope of claim 9, wherein the beating means operates on optical signals.

14. The confocal microscope of claim 9, wherein the beating means operates on electrical signals.

15. The confocal microscope of claim 9, wherein the object includes fluorophores, and wherein the fluorophores fluoresce at a fluorescing frequency when impinged upon by a light source, and wherein the detectors detect light at the fluorescing frequency.

16. A confocal microscope for imaging light from a source onto an object, comprising:

a modulator configured to modulate light from the source at a modulating frequency;

a detector configured to receive modulated light of the source from the modulator;

a filter configured to filter modulated light received by the detector based on the modulating frequency;

a signal generator configured for generating an offset modulating frequency;

a mixer to mix modulated light of the modulating frequency with the offset modulating frequency, the mixer having a band pass filter configured to filter a difference signal generated by mixing modulated light with the offset modulating frequency and supplying the difference signal to the detector such that the detector and the filter substantially eliminate cross talk.

* * * * *